United States Patent
Nakabayashi et al.

(10) Patent No.: US 12,328,060 B2
(45) Date of Patent: Jun. 10, 2025

(54) POWER CONVERSION CIRCUIT CONTROLLER WITH FEEDFORWARD CORRECTION

(71) Applicant: Mitsubishi Electric Corporation, Tokyo (JP)

(72) Inventors: Akinu Nakabayashi, Tokyo (JP); Takashi Kaneyama, Tokyo (JP); Matahiko Ikeda, Tokyo (JP); Shingo Kato, Tokyo (JP); Ryota Kondo, Tokyo (JP); Hiroki Kurahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 28 days.

(21) Appl. No.: 17/677,483

(22) Filed: Feb. 22, 2022

(65) Prior Publication Data
US 2022/0368231 A1    Nov. 17, 2022

(30) Foreign Application Priority Data
May 14, 2021    (JP) .................................. 2021-082086

(51) Int. Cl.
*H02M 1/00*    (2007.01)
(52) U.S. Cl.
CPC ....... *H02M 1/0025* (2021.05); *H02M 1/0022* (2021.05)
(58) Field of Classification Search
CPC . H02M 1/0025; H02M 1/0016; H02M 1/0022
See application file for complete search history.

(56) References Cited

U.S. PATENT DOCUMENTS

| 7,239,257 B1 * | 7/2007 | Alexander ............ H02M 3/157 341/138 |
| 2003/0117823 A1 | 6/2003 | Sato |

(Continued)

FOREIGN PATENT DOCUMENTS

| JP | 2003-189599 A | 7/2003 |
| JP | 6153144 B1 | 6/2017 |

(Continued)

OTHER PUBLICATIONS

Communication dated Apr. 5, 2022 from the Japanese Patent Office in Application No. 2021-082086.
(Continued)

*Primary Examiner* — Peter M Novak
(74) *Attorney, Agent, or Firm* — Sughrue Mion, PLLC

(57) ABSTRACT

To provide a controller for power conversion circuit which can maintain the detection value of second voltage at the target value of second voltage without depending on feedback control, when the first voltage is varied. A controller for power conversion circuit changes a control value by feedback control so that the detection value of second voltage approaches a target value of second voltage; calculates a control value for control, by correcting the control value based on the detection value of first voltage so as to correct, in feedforward manner, a change of the control value due to a change of the first voltage if correction of the control value is not performed; and controls on/off the switching device based on the control value for control.

10 Claims, 15 Drawing Sheets

(56) References Cited

U.S. PATENT DOCUMENTS

| | | | |
|---|---|---|---|
| 2004/0228150 A1 | 11/2004 | Sato | |
| 2012/0146605 A1* | 6/2012 | Oyama | H02M 3/156 |
| | | | 323/282 |
| 2017/0271989 A1 | 9/2017 | Ikeda et al. | |
| 2022/0224230 A1* | 7/2022 | Chakkirala | H02M 3/157 |

FOREIGN PATENT DOCUMENTS

| | | |
|---|---|---|
| JP | 6793783 B1 | 11/2020 |
| JP | 2020-202707 A | 12/2020 |

OTHER PUBLICATIONS

Chinese Office Action issued Apr. 18, 2025 in Patent Application No. 202210475759.X.

* cited by examiner

POWER CONVERSION CIRCUIT CONTROLLER WITH FEEDFORWARD CORRECTION

INCORPORATION BY REFERENCE

This application claims priority to JP Application No 2021-082086 filed on May 14, 2021 in the Japanese Patent Office.

The disclosure of Japanese Patent Application No. 2021-82086 filed on May 14, 2021 including its specification, claims and drawings, is incorporated herein by reference in its entirety.

BACKGROUND

The present disclosure relates to a controller for power conversion circuit.

JP 6153144 B discloses the controller for power conversion circuit which controls the power conversion circuit having the switching devices and the reactor and performs power conversion between the first terminal and the second terminal.

In the technology of JP 6153144 B, the calculation value X is changed by the feedback control based on the deviation between the detection value of second voltage and the target value of second voltage which are voltages of the second terminal, and the dumping control based on the reactor current; the calculation value X is corrected based on the detection value of first voltage Vin; and the duty ratio Duty of the switching device is calculated.

SUMMARY

If the first voltage which is voltage of the first terminal is varied due to some factor, the duty ratio of the switching device will eventually change in order to maintain the detection value of the second voltage at the target value. However, if the duty ratio is changed by feedback control, a delay due to the feedback control occurs, and the detection value of second voltage deviates from the target value of second voltage. If the second voltage exceeds a protection threshold value, the on/off control of the switching device is stopped by the function of overvoltage protection provided in the controller or the power conversion circuit, and the power conversion of the power conversion circuit is stopped. In order to reduce a rise of the second voltage when the first voltage is varied, it is necessary to reduce the target value of the second voltage, and to increase the capacity of the second terminal side smoothing capacitor. These changes correspond to a drop of output voltage and an increase of the device size.

In the technology of JP 6153144 B, the correction is performed to the calculation value X calculated by feedback control, based on the detection value of first voltage Vin. The gain of the transfer function of the duty ratio Duty with respect to the calculation value X does not change due to the change of resonance frequency. However, in the technology of JP 6153144 B, variation of the first voltage is not considered, and as explained using the equation (4) and the equation (5) of the present disclosure discussing JP 6153144 B, when the first voltage is varied, it is necessary to change the calculation value X by feedback control in order to make the detection value of second voltage follow the target value of second voltage. Therefore, in the technology of JP 6153144 B, the above problem cannot be solved.

Then, the purpose of the present disclosure is to provide a controller for power conversion circuit which can maintain the detection value of second voltage at the target value of second voltage without depending on feedback control, when the first voltage is varied.

A controller for power conversion circuit according to the present disclosure is a controller for power conversion circuit that controls a power conversion circuit which is provided with one or a plurality of switching devices which are connected with a second terminal in parallel, and a reactor whose one end is connected to a first terminal and whose other end is connected to the switching device, and performs power conversion between the first terminal and the second terminal, the controller for power conversion circuit including:

a second voltage detection unit that detects a second voltage which is a voltage of the second terminal;

a first voltage detection unit that detects a first voltage which is a voltage of the first terminal;

a control value calculation unit that change a control value by feedback control so that a detection value of the second voltage approaches a target value of the second voltage;

a control value correction unit that calculates a control value for control, by correcting the control value based on a detection value of the first voltage so as to correct, in feedforward manner, a change of the control value due to a change of the first voltage if correction of the control value is not performed; and a switching control unit that controls on/off the switching device based on the control value for control.

According to the controller for power conversion circuit of the present disclosure, when the first voltage is varied, the control value for control is changed so as to correct, in feedforward manner, the change of the control value due to the change of the first voltage, based on the detection value of first voltage. When the detection value of first voltage is varied, the detection value of second voltage can be maintained at the target value of second voltage without changing the control value by feedback control. Therefore, when the first voltage is varied, the following delay due to the feedback control can be prevented from occurring, and the deviation amount of the second voltage from the target value of second voltage can be reduced.

DETAILED DESCRIPTION OF THE EMBODIMENTS

1. Embodiment 1

Figure 1:
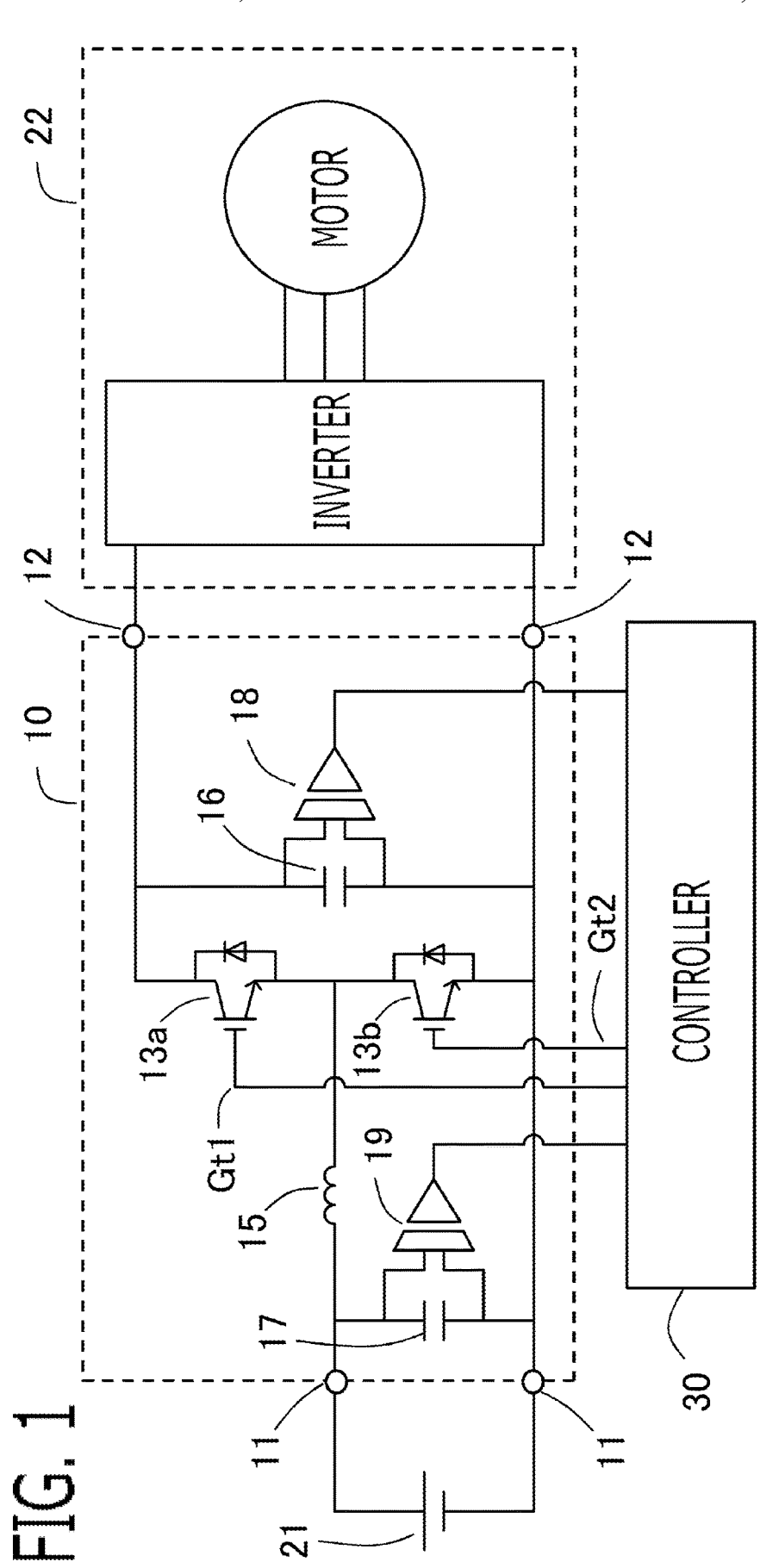
FIG. 1 is a schematic configuration diagram of the power conversion circuit and the controller according to Embodiment 1.

A power conversion circuit 10 and a controller for power conversion circuit 30 (hereinafter, referred to simply as the controller 30) according to Embodiment 1 will be explained with reference to drawings. FIG. 1 is a schematic configuration diagram of the power conversion circuit 10 and the controller 30 according to the present embodiment.

1-1. Power Conversion Circuit 10

The power conversion circuit 10 is provided with a switching device and a reactor 15, and performs power conversion between a first terminal 11 and a second terminal 12. A DC power source or a load is connected to the first terminal 11, and a DC power source or a load is connected to the second terminal 12. In the present embodiment, a DC power source 21 is connected to the first terminal 11, and a load 22 is connected to the second terminal 12. As the DC power source 21, a DC power source whose output voltage is varied according to an internal state is used. For example, an electricity accumulation device is used for the DC power source 21, and the output voltage which becomes a first voltage V1 is changed according to a charging state of the electricity accumulation device. Alternatively, a voltage variable device, such as a DC-DC converter, is also provided in the DC power source 21, and the output voltage is changed according to an operating states of the voltage variable device. The load 22 is an inverter and a motor.

In the present embodiment, the power conversion circuit 10 is a DC-DC converter which converts DC power. The power conversion circuit 10 is a step-up chopper circuit which steps up DC voltage from the first terminal 11 to the second terminal 12.

The power conversion circuit 10 is provided with one or a plurality of switching devices which are connected with the second terminal 12 in parallel, and a reactor 15 whose one end is connected to a high potential side of the first terminal 11 and whose other end is connected to the switching device. In the present embodiment, the two switching devices 13a, 13b which are connected in series are connected with the second terminal 12 in parallel. That is to say, the high potential side switching device 13a and the low potential side switching device 13b are connected in series between the high potential side and the low voltage side of the second terminal 12. The other end of the reactor 15 is connected to a connection node between the two switching devices 13a, 13b. A diode may be used instead of the high potential side switching device 13a.

IGBT (Insulated Gate Bipolar Transistor) in which a diode is connected in inverse parallel, MOSFET (Metal Oxide Semiconductor Field Effect Transistor) which has a function of diode connected in inverse parallel, or the like is used for the switching device. Alternatively, various kinds of switching devices, such as SiC (Silicon Carbide)-MOSFET, GaN (Gallium Nitride)-FET, or GaN-HEMT (High Electron Mobility Transistor), may be used for the switching device.

Each gate driving signal Gt1, Gt2 outputted from the controller 30 is inputted into the gate terminal of each switching device 13a, 13b, respectively, and each switching device 13a, 13b is turned on and off according to each gate driving signal Gt1, Gt2.

The high potential side of the first terminal 11 is connected to the connection node of the two switching devices 13a, 13b via the reactor 15. The low voltage side of the first terminal 11 is connected to the low voltage side of the second terminal 12.

A second terminal side smoothing capacitor 16 connected with the second terminal 12 in parallel is provided. The second terminal side smoothing capacitor 16 is provided on the second terminal 12 side than the two switching devices 13a, 13b. A first terminal side smoothing capacitor 17 connected with the first terminal 11 in parallel is provided. The first terminal side smoothing capacitor 17 is provided on the first terminal 11 side than the reactor 15.

A second voltage detection circuit 18 which detects a second voltage V2 which is a voltage of the second terminal 12 is provided. The second voltage detection circuit 18 detects a both-end voltage of the second terminal side smoothing capacitor 16. An output signal of the second voltage detection circuit 18 is inputted into the controller 30.

A first voltage detection circuit 19 which detects a first voltage V1 which is a voltage of the first terminal 11 is provided. The first voltage detection circuit 19 detects a both-end voltage of the first terminal side smoothing capacitor 17. An output signal of the first voltage detection circuit 19 is inputted into the controller 30.

1-2. Controller 30

Figure 2:
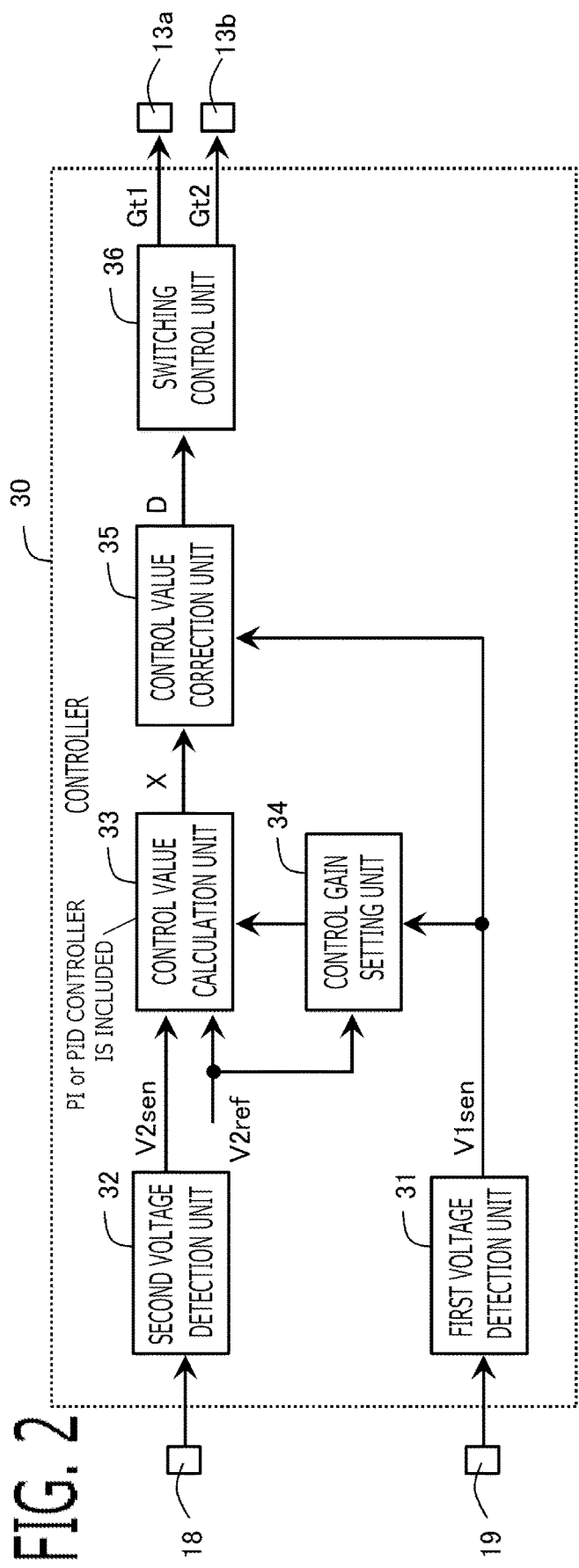
FIG. 2 is a block diagram of the controller according to Embodiment 1.
Figure 3:
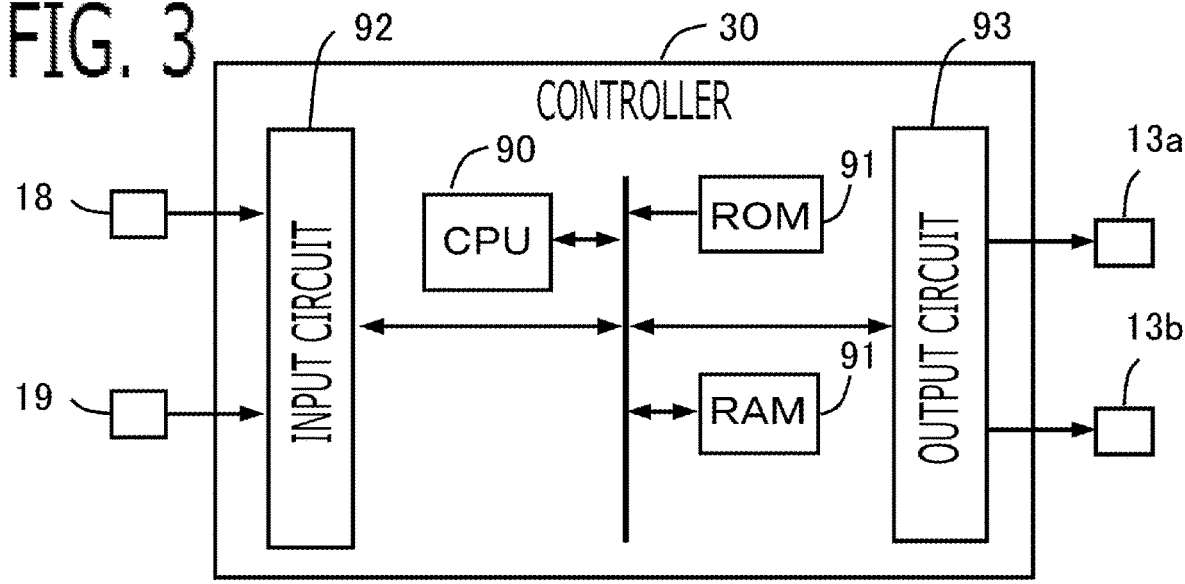
FIG. 3 is a hardware configuration diagram of the controller according to Embodiment 1.

The controller 30 controls the power conversion circuit 10. As shown in FIG. 2, the controller 30 is provided with a first voltage detection unit 31, a second voltage detection unit 32, a control value calculation unit 33, a control gain setting unit 34, a control value correction unit 35, a switching control unit 36, and the like. Each function of the controller 30 is realized by processing circuits provided in the controller 30. Specifically, as shown in FIG. 3, the controller 30 is provided with, as a processing circuit, an arithmetic processor (computer) 90 such as a CPU (Central Processing Unit), storage apparatuses 91 which exchange data with the arithmetic processor 90, an input circuit 92 which inputs external signals to the arithmetic processor 90, an output circuit 93 which outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed.

As the storage apparatus 91, volatile and nonvolatile storage apparatuses, such as RAM (Random Access Memory), ROM (Read Only Memory), and EEPROM (Electrically Erasable Programmable ROM), are provided. The input circuit 92 is connected with various kinds of sensors and switches such as the first voltage detection circuit 19 and the second voltage detection circuit 18, and is provided with an A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 30, such as the storage apparatus 91, the input circuit 92, and the output circuit 93, so that the respective functions of the control units 31 to 36 provided in the controller 50 are realized. Setting data items such as the control gain to be utilized in the control units 31 to 36 are stored, as part of software items (programs), in the storage apparatus 91 such as a ROM. Each function of the controller 30 will be described in detail below.

1-2-1. Voltage Detection Unit

The second voltage detection unit 32 detects the second voltage V2 which is a voltage of the second terminal 12. In the present embodiment, the second voltage detection unit 32 detects the second voltage V2, based on the output signal of the second voltage detection circuit 18.

The first voltage detection unit 31 detects the first voltage V1 which is a voltage of the first terminal 11. In the present embodiment, the first voltage detection unit 31 detects the first voltage V1, based on the output signal of the first voltage detection circuit 19.

1-2-2. Control Value Calculation Unit 33

The control value calculation unit 33 changes a control value X by feedback control so that the detection value of second voltage V2sen approaches a target value of second voltage V2ref. As the feedback control, the control value calculation unit 33 performs at least a proportional control and an integral control, based on a deviation ΔV2 between the detection value of second voltage V2sen and the target value of second voltage V2ref. In the present embodiment, the proportional control and the integral control, that is, PI control, is performed. In addition to the proportional control and the integral control, a differential control, that is, PID control, may be performed. The target value of second voltage V2ref may be calculated in the controller 30, or may be transmitted from the outside of the controller 30.

In detail, as shown in the next equation, the control value calculation unit 33 calculates the deviation ΔV2 by subtracting the detection value of second voltage V2sen from the target value of second voltage V2ref; calculates a proportional control value Xp by multiplying a proportional gain Kp to the deviation ΔV2; calculates an integral control value Xi by integrating a value obtained by multiplying an integral gain Ki to the deviation ΔV2; and calculates the control value X by adding the proportional control value Xp and the integral control value Xi. The control gain setting unit 34 which sets the proportional gain Kp and the integral gain Ki is described below.

$$\Delta V2 = V2_{ref} - V2_{sen} \quad (1)$$

$$X_p = K_p \times \Delta V2$$

$$X_i = K_i \times \Delta V2 \frac{1}{s}$$

$$X = X_p + X_i$$

In the equation (1), s is Laplacian operator, and 1/s expresses an integral calculation of continuous system. In the present embodiment, the control value calculation unit 33 performs calculation at every calculation period ΔT. The discretized next equation is practically used for a calculation of the integral control value Xi of the third equation of the equation (1). Herein, (m) expresses a value calculated at this time calculation period, and (m−1) expresses a value calculated at the last time calculation period.

$$X_i(m) = X_i(m-1) + K_i \times \Delta V2 \times \Delta T \quad (2)$$

1-2-3. Switching Control Unit 36

The switching control unit 36 controls on/off the switching device, based on the control value for control D calculated by the control value correction unit 35 described below. The switching control unit 36 generates gate driving signals Gt1, Gt2 of the high potential side and the low potential side switching devices 13a, 13b by PWM (Pulse Width Modulation) control based on the control value for control D, respectively. In the present embodiment, the control value for control D is ON duty ratio of the low potential side switching device 13b, and is OFF duty ratio of the high potential side switching device 13a. When the low potential side switching device 13b is ON, the high potential side switching device 13a becomes OFF. A dead time in which both switching devices become OFF is provided between the ON period of the high potential side switching device 13a and the ON period of the low potential side switching device 13b, so that the two switching devices 13a, 13b are not turned on at the same time, and the high potential side and the low voltage side are not short-circuited.

Figure 4:
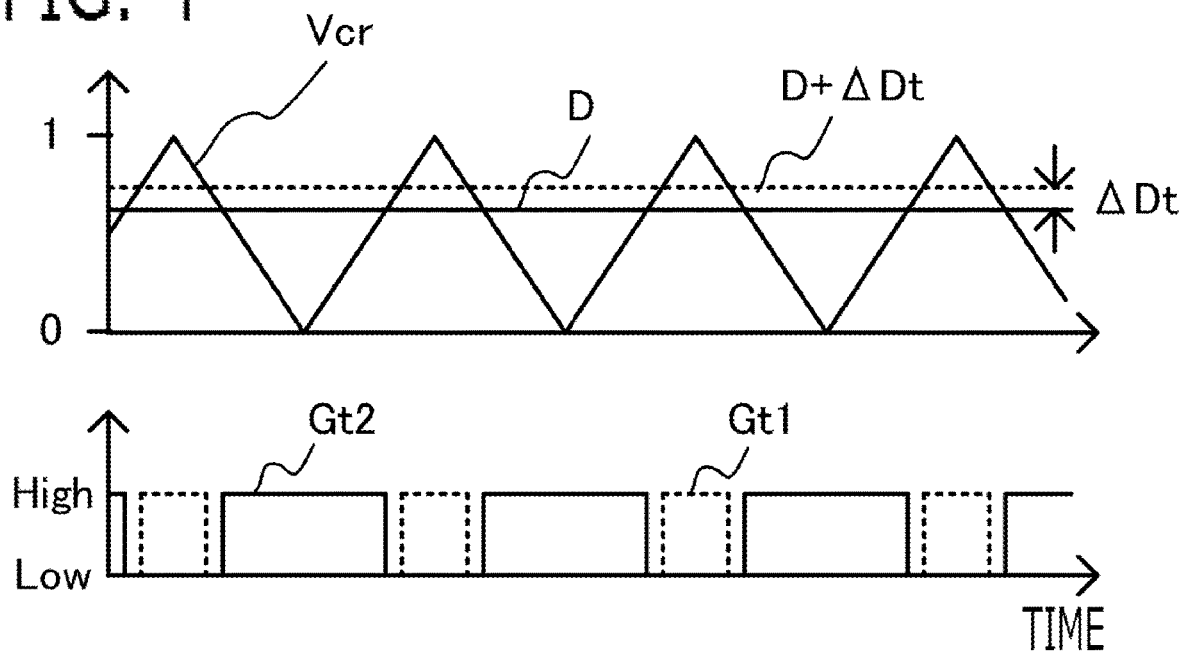
FIG. 4 is a time chart for explaining the on/off control of the switching device based on the duty ratio according to Embodiment 1.

For example, as shown in FIG. 4, the switching control unit 36 compares the control value for control D with a carrier wave Vcr, and generates the gate driving signal Gt1, Gt2 of each switching device. The carrier wave Vcr is a triangular wave which oscillates between 0 to 1 at an on/off control period (PWM control period). The switching control unit 36 sets the gate driving signal Gt2 of the low potential side to High when the control value for control D is larger than the carrier wave Vcr, and set the gate driving signal Gt2 of the low voltage side to Low when the control value for control D is smaller than the carrier wave Vcr. The switching control unit 36 sets the gate driving signal Gt1 of the high potential side to Low, when a duty ratio D+ΔDt obtained by adding a value ΔDt corresponding to the dead time to the control value for control D is larger than the carrier wave Vcr, and set the gate driving signal Gt1 of the high potential side to High, when the duty ratio D+ΔDt after addition is smaller than the carrier wave Vcr. As the carrier wave Vcr, a saw-tooth-wave or a reverse saw-tooth-wave may be used.

1-2-4. Control Value Correction Unit 35
<Problem When the Control Value Correction Unit 35 is Not Provided>

First, the principle of correction of the control value X will be explained. In the ideal state, the next equation is established among the control value for control D which becomes the ON duty ratio of the low potential side switching device 13*b*, the first voltage V1, and the second voltage V2.

$$D = \frac{V2 - V1}{V2} \quad (3)$$

As seen from the equation (3), the control value for control D (the ON duty ratio of the low potential side) changes according to the second voltage V2, and changes according to the first voltage V1. Accordingly, when the first voltage V1 is varied due to some factor, it is necessary to change the control value for control D (ON duty ratio of the low potential side). In the case of the comparative example where the control value X is not corrected in feedforward manner by the control value correction unit 35 described below, it is necessary to change the control value X by the feedback control of the control value calculation unit 33. Therefore, when the first voltage V1 is varied, the following delay due to the feedback control occurs, and the second voltage V2 deviate from the target value of second voltage V2ref.

Figure 5:
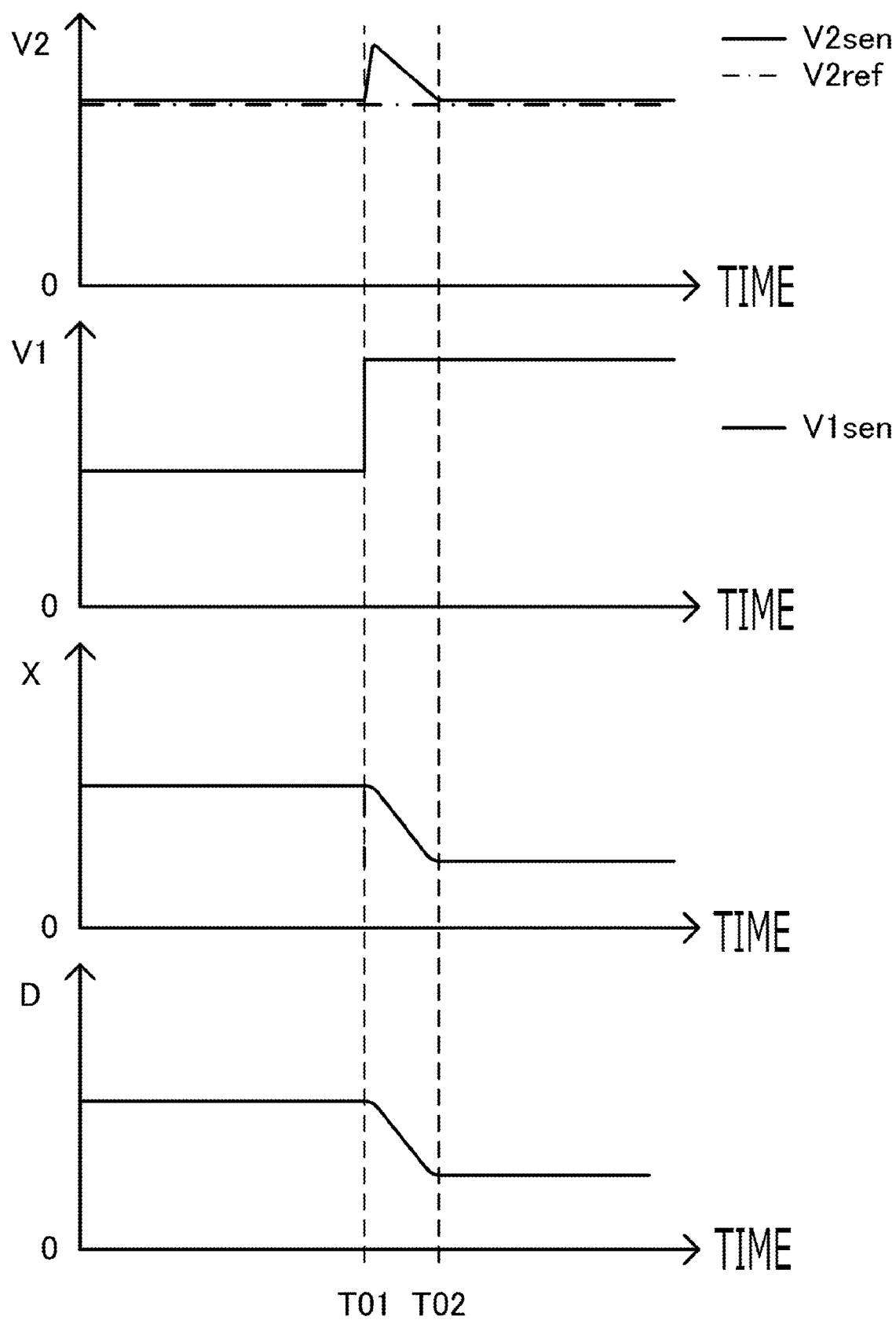
FIG. 5 is a time chart for explaining the control behavior when the first voltage is varied according to the comparative example.

The control behavior in the case of the comparative example where the control value correction unit 35 is not provided will be explained using FIG. 5. Until the time T01, the first voltage V1 is stabilized at a constant value, the detection value of second voltage V2sen follows the target value of second voltage V2ref which is set to a constant value, and the control value X and the control value for control D which is set to the control value X as it is are stabilized at constant values.

At the time T01, the first voltage V1 increases stepwise due to some factor. As a result, the detection value of second voltage V2sen rises than the target value of second voltage V2ref. The control value X is decreasing gradually by the feedback control so that the detection value of second voltage V2sen approaches the target value of second voltage V2ref. However, from the time T01 to the time T02, the detection value of second voltage V2sen deviates to the high potential side than the target value of second voltage V2ref due to the following delay of feedback control.

At this time, if the detection value of second voltage V2sen exceeds a protection threshold value, the on/off control of the switching device is stopped by the function of overvoltage protection provided in the controller 30 or the power conversion circuit 10, and the step-up operation of the power conversion circuit 10 is stopped. In the case of the comparative example, in order to reduce a rise of the second voltage V2 when the first voltage V1 is varied, it is necessary to reduce the target value of second voltage V2ref, and to increase the capacity of the second terminal side smoothing capacitor 16, and a drop of output voltage and enlargement of the device are caused. Accordingly, without causing the drop of output voltage and enlargement of the device, it is required to suppress the variation of the second voltage V2 when the first voltage V1 is varied.

By the way, in JP 6153144 B, the control value X calculated by the feedback control is corrected as shown in the next equation according to the equation (2) and FIG. 2 of JP 6153144 B, and the control value for control D is calculated.

In case of JP 6153144 B $$D = \frac{X}{X + V1} \quad (4)$$

When the equation (4) is substituted for the equation (3) and is rearranged with regard to the control value X, the equation (5) is obtained. As seen from the equation (5), in the technology of JP 6153144 B, the control value X is corrected using the equation (4) and the control value for control D is calculated. However, the control value X is varied by variation of the first voltage V1, and it is necessary to change the control value X by feedback control. Accordingly, even in the technology of JP 6153144 B, when the first voltage V1 is varied, the following delay due to the feedback control will occur, and the second voltage V2 will deviate from the target value of second voltage V2ref.

In case of JP 6153144 B $$\frac{X}{X + V1} = \frac{V2 - V1}{V2} \rightarrow X = V2 - V1 \quad (5)$$

<Configuration of Control Value Correction Unit 35>

Then, the control value correction unit 35 calculates the control value for control D, by correcting the control value X based on the detection value of first voltage V1sen so as to correct, in feedforward manner, a change of the control value due to a change of the first voltage V1 if correction of the control value X is not performed.

According to this configuration, when the first voltage V1 is varied, the control value for control D is changed so as to correct in feedforward manner the change of the control value due to the change of the first voltage V1, based on detection value of first voltage V1sen. Accordingly, when the detection value of first voltage V1sen is varied, it becomes unnecessary to change the control value X by feedback control. Therefore, when the first voltage V1 is varied, the following delay due to the feedback control can be prevented from occurring, and the deviation amount of the second voltage V2 from the target value of second voltage V2ref can be reduced.

In the present embodiment, the control value correction unit 35 calculates the control value for control D using the next equation.

$$D = \frac{X - V1_{sen}}{X} \quad (6)$$

When the equation (6) is substituted for the equation (3) and is rearranged with regard to the control value X, the equation (7) is obtained. As seen from the equation (7), the control value X becomes the second voltage V2 regardless of variation of the first voltage V1. Therefore, according to variation of the first voltage V1, the control value X can be prevented from being varied. The following delay due to the feedback control can be prevented from occurring, and the second voltage V2 can be prevented from deviating from the target value of second voltage V2ref.

$$\frac{X-V1}{X} = \frac{V2-V1}{V2} \rightarrow X = V2 \tag{7}$$

Figure 6:
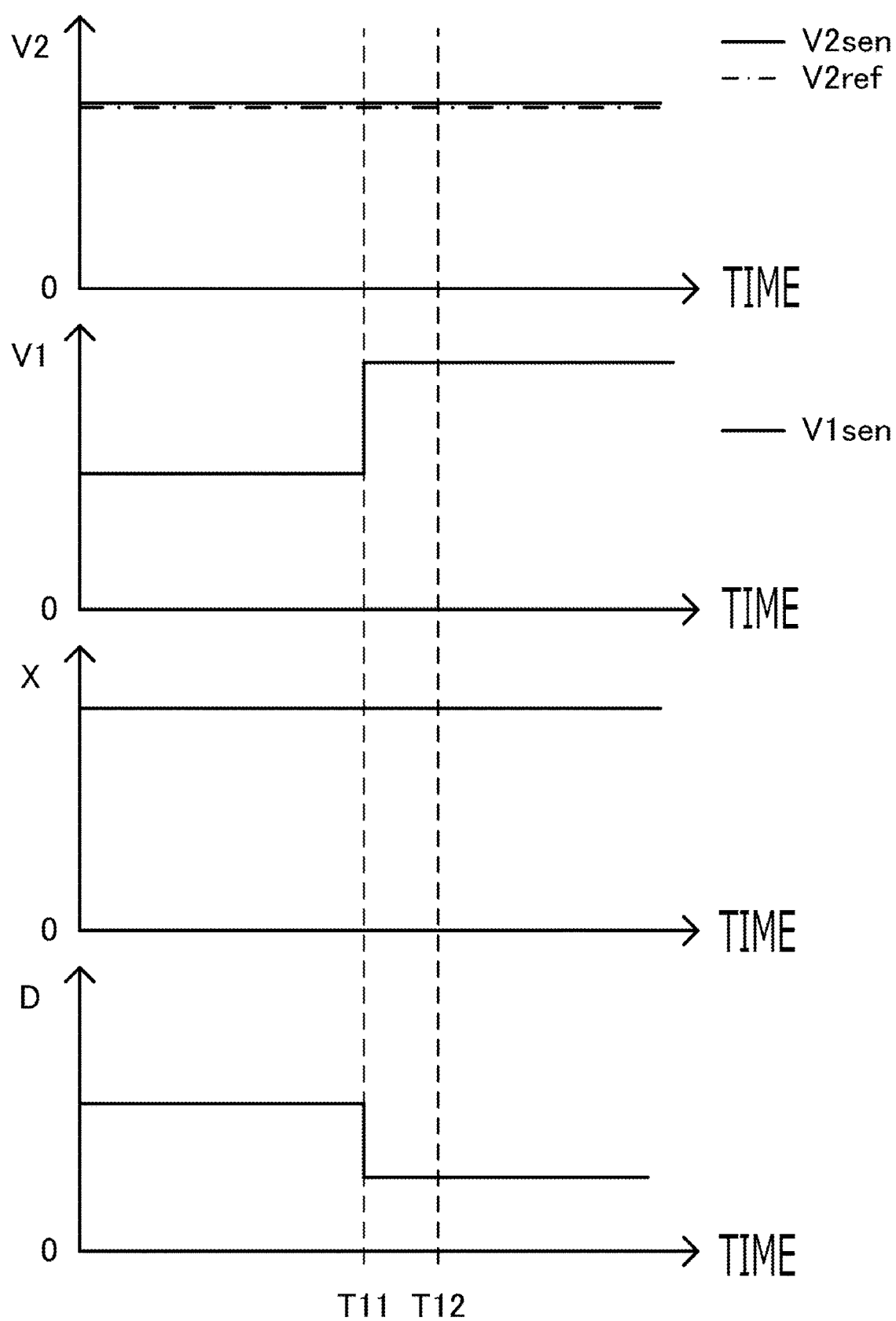
FIG. 6 is a time chart for explaining the control behavior when the first voltage is varied according to Embodiment 1.

The control behavior of the present embodiment where the control value correction unit 35 is provided will be explained using FIG. 6. Similarly to FIG. 5, until the time T11, the detection value of first voltage V1sen is stabilized at a constant value, the detection value of second voltage V2sen follows the target value of second voltage V2ref which is set to a constant value, and the control value X and the control value for control D which is set to the control value X as it is are stabilized at constant values.

At the time T11, the detection value of first voltage V1sen increases stepwise due to some factor. After the time T11, the control value for control D is calculated, by correcting the control value X based on the increased detection value of first voltage V1sen, so as to correct in feedforward manner the change of the control value due to the change of the first voltage V1. And, the control value for control D decreases stepwise. As the result, even if the control value X is not changed by the feedback control, the control value for control D is changed in feedforward manner based on the detection value of first voltage V1sen, and the detection value of second voltage V2sen can be prevented from deviating from the target value of second voltage V2ref. As the result, unlike the comparative example, it is not necessary to reduce the target value of second voltage V2ref, and to increase the capacity of the second terminal side smoothing capacitor 16 considering the variation of the first voltage V1, and a drop of output voltage and enlargement of the device can be suppressed. However, in practice, due to the detection error of the first voltage due to the sensor error, the detection delay of variation of the first voltage due to the calculation period, and the like, an error occurs in feedforward correction, and the second voltage V2 is varied from the target value of second voltage V2ref to some extent. Accordingly, the feedback control is necessary.

1-2-5. Control Gain Setting Unit 34

The control gain setting unit 34 sets a proportional gain Kp and an integral gain Ki. The proportional gain Kp and the integral gain Ki may be fixed values. But, in the present embodiment, in order to make feedback response and stability better, the proportional gain Kp and the integral gain Ki are variable according to a voltage boosting ratio Rbst which is a ratio of the second voltage with respect to the first voltage. The details will be explained below.

<Transfer Function of Control Subject>

A transfer function of the second voltage V2 with respect to the control value for control D (the duty ratio D) can be expressed as the next equation.

$$\frac{V2(s)}{D(s)} = \frac{1}{(1-D^2)} \frac{V1 - s \times L \times IL_{ave}}{\left(\frac{s}{\omega_0}\right)^2 + 1} \tag{8}$$

$$\omega_0 = \frac{1-D}{\sqrt{L \times C_2}}$$

Herein, ILave is an average value of a reactor current IL which is oscillating, L is an inductance of the reactor 15, $\omega 0$ is a resonance angular frequency, and C2 is a capacity of the second terminal side smoothing capacitor 16.

As shown in the equation (3), when the first voltage V1 and the second voltage V2 change, the control value for control D (duty ratio D) changes, and the resonance angular frequency $\omega 0$ changes as shown in the second equation of an equation (8). That is to say, according to the voltage boosting ratio Rbst (V2/V1) which is a ratio of the second voltage V2 with respect to the first voltage V1, the control value for control D (duty ratio D) changes, and the resonance angular frequency $\omega 0$ changes.

Figure 7:
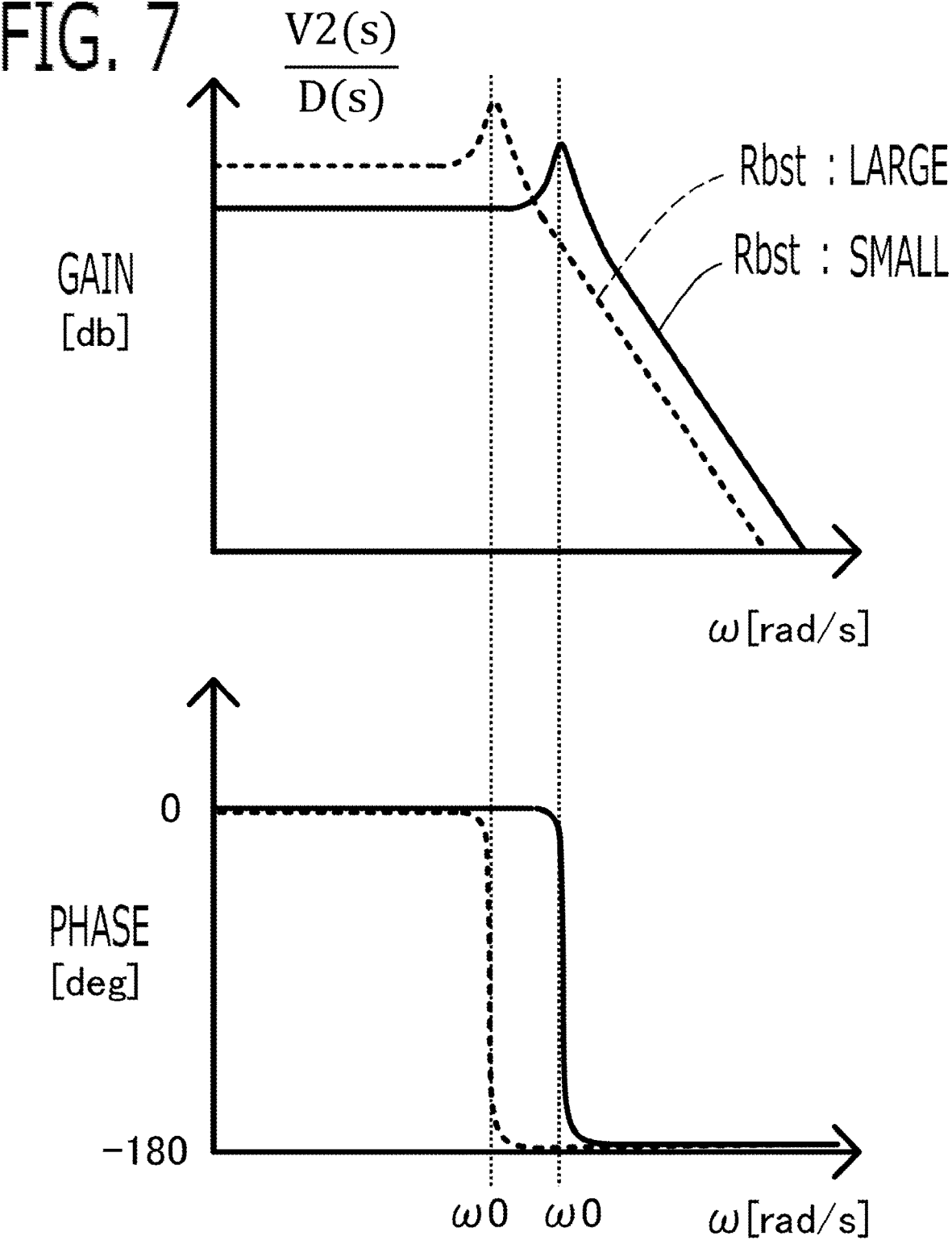
FIG. 7 is a Bode diagram of the transfer function of the second voltage with respect to the control value for control at two different voltage boosting ratios according to Embodiment 1.

FIG. 7 shows Bode diagram of the transfer function of the equation (8) at two different voltage boosting ratios Rbst. About each voltage boosting ratio Rbst, at the resonance angular frequency $\omega 0$, a gain increases and a phase is delayed 180 degrees. When the voltage boosting ratio Rbst is comparatively large, the control value for control D (duty ratio D) becomes large, the resonance angular frequency $\omega 0$ becomes low, and the gain of angular frequencies lower than the resonance angular frequency $\omega 0$ becomes large. When the voltage boosting ratio Rbst is comparatively small, the control value for control D (duty ratio D) becomes small, the resonance angular frequency $\omega 0$ becomes high, and the gain of angular frequencies lower than the resonance angular frequency $\omega 0$ becomes small.

In the present embodiment, there is the relationship of the equation (6) between the control value X and the control value for control D (the duty ratio D). Accordingly, a transfer function of the second voltage V2 with respect to the control value X can be expressed as the next equation.

$$\frac{V2(s)}{X(s)} = \frac{1 - s \times \frac{L \times IL_{ave}}{V1}}{\left(\frac{s}{\omega_0}\right)^2 + 1} \tag{9}$$

$$\omega_0 = \frac{1-D}{\sqrt{L \times C_2}}$$

Figure 8:
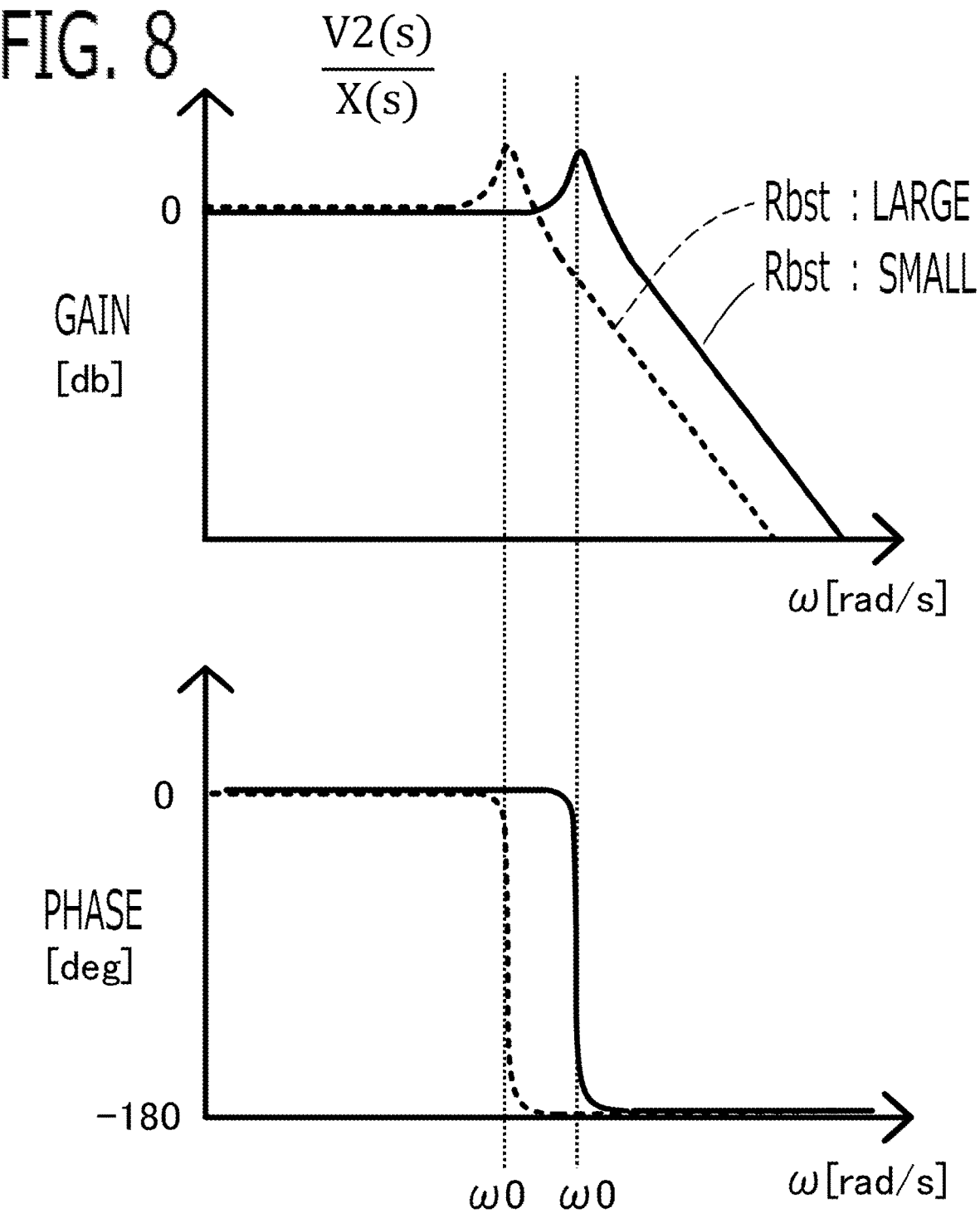
FIG. 8 is a Bode diagram of the transfer function of the second voltage with respect to the control value at two different voltage boosting ratios according to Embodiment 1.

FIG. 8 shows Bode diagram of the transfer function of the equation (9) at two different voltage boosting ratios Rbst. Even if the voltage boosting ratios Rbst are different, as shown in the equation (9), at angular frequencies lower than the resonance angular frequency $\omega 0$, V2(s)/X (s) becomes 1, and the gain [db] becomes 0. On the other hand, if the voltage boosting ratios Rbst are different, the resonance angular frequency $\omega 0$ is changed similar to the equation (8) and FIG. 7. That is, when the voltage boosting ratio Rbst is comparatively large, the control value for control D (duty ratio D) becomes large, and the resonance angular frequency $\omega 0$ becomes low, but the gain of angular frequencies lower than the resonance angular frequency $\omega 0$ does not change. When the voltage boosting ratio Rbst is comparatively small, the control value for control D (duty ratio D) becomes small, and the resonance angular frequency $\omega 0$ becomes high, but the gain of angular frequencies lower than the resonance angular frequency $\omega 0$ does not change.

<Setting of Control Gain>

As shown in FIG. 8, as the voltage boosting ratio Rbst increases, the resonance angular frequency $\omega 0$ becomes low, and a frequency at which a phase reverses 180 degrees becomes low. Accordingly, if the same control gain is used regardless of the voltage boosting ratio Rbst, the equivalent stability and the equivalent response of closed loop may not be secured against the change of the voltage boosting ratio Rbst.

If the break point angular frequency $\omega ip$ of PI controller is made lower than the resonance angular frequency $\omega 0$, the stability of closed loop can be secured.

Figure 9:
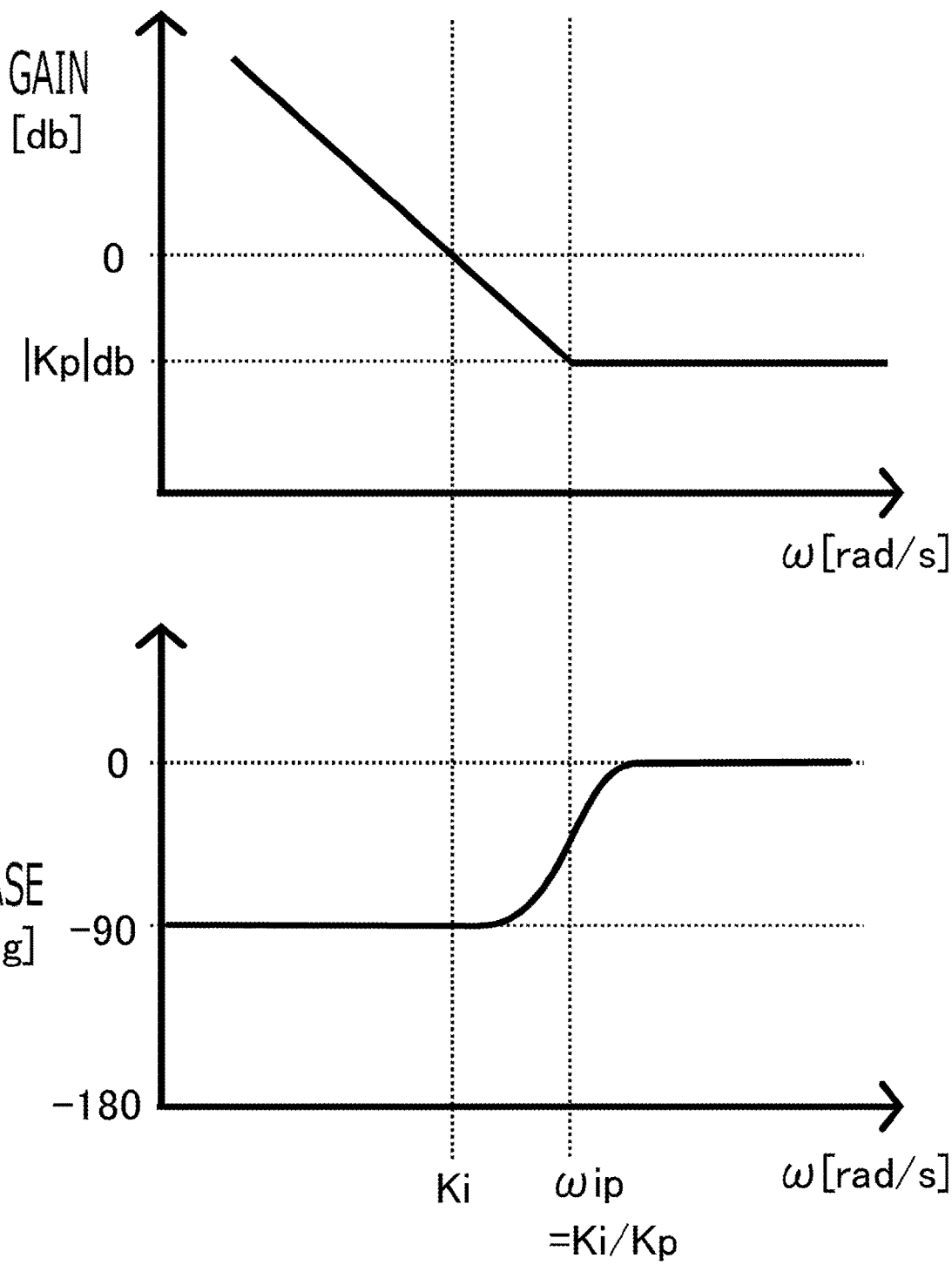
FIG. 9 is a Bode diagram of the transfer function of the different PI controller according to Embodiment 1.

As FIG. 9 shows Bode diagram of PI controller, the break point angular frequency ωip of PI controller is an angular frequency of the boundary between the integral element and the proportional element, and becomes ωip=Ki/Kp. As shown in the next equation, the integral gain Ki and the proportional gain Kp may be adjusted so that the break point angular frequency ωip becomes lower than the resonance angular frequency ω0. The resonance angular frequency ω0 changes in inverse proportion to the voltage boosting ratio Rbst (=V2/V1). Accordingly, the control gain setting unit 34 may set the proportional gain Kp and the integral gain Ki based on the voltage boosting ratio Rbst, so that the break point angular frequency ωip of PI controller obtained by dividing the integral gain Ki by the proportional gain Kp becomes lower than the resonance angular frequency ω0 which changes in inverse proportion to the voltage boosting ratio Rbst.

$$\omega_{ip} = \frac{K_i}{K_p} < \omega_0 = \frac{1-D}{\sqrt{L \times C_2}} = \frac{1}{\sqrt{L \times C_2}} \frac{1}{R_{bst}} \quad (10)$$

In order to maintain the stability of closed loop, as the voltage boosting ratio Rbst increases and the resonance angular frequency ω0 lowers, the break point angular frequency ωip (=Ki/Kp) may be lowered. As shown in the next equation obtained by rearranging the equation (10) with regard to the proportional gain Kp, if the integral gain Ki is not changed, as the voltage boosting ratio Rbst increases and the resonance angular frequency ω0 lowers, the proportional gain Kp may be increased.

$$K_p > \frac{K_i}{\omega_0} \propto R_{bst} \quad (11)$$

Figure 10:
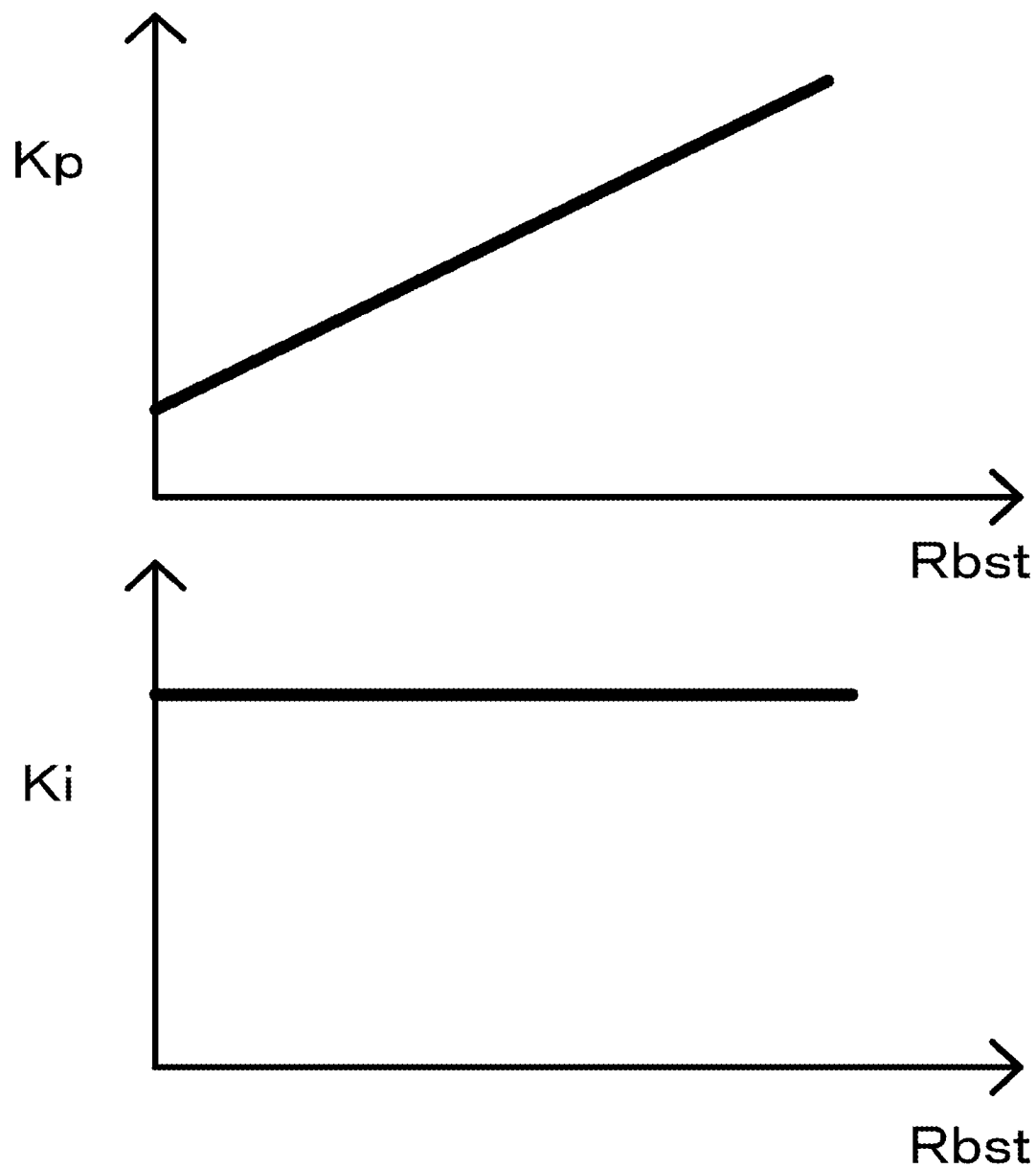
FIG. 10 is a figure for explaining the setting of the proportional gain and the integral gain according to the voltage boosting ratio according to Embodiment 1.

Then, as shown in FIG. 10, as the voltage boosting ratio Rbst (=V2/V1) which is a ratio of the second voltage V2 with respect to the first voltage V1 increases, the control gain setting unit 34 increases the proportional gain Kp, and does not increase the integral gain Ki, but sets the integral gain Ki to a constant value.

According to this configuration, by increasing the proportional gain Kp as the voltage boosting ratio Rbst increases, the break point angular frequency ωip of PI controller is lowered in accordance with the lowered resonance angular frequency ω0, and the stability of closed loop can be maintained. And, since the integral gain Ki is not changed, the response of closed loop can be maintained similarly regardless of the change of the voltage boosting ratio Rbst.

For example, the control gain setting unit 34 calculates the resonance angular frequency ω0 based on the voltage boosting ratio Rbst using the equation (10), and calculates the proportional gain Kp by multiplying a coefficient α larger than 1 to a value obtained by dividing the integral gain Ki by the resonance angular frequency ω0, as shown in the next equation.

$$K_p = \alpha \frac{K_i}{\omega_0}, \alpha > 1 \quad (12)$$

Alternatively, by referring to a proportional gain setting map data in which a relationship between the voltage boosting ratio Rbst and the proportional gain Kp is preliminarily set, the control gain setting unit 34 may calculate the proportional gain Kp corresponding to the current voltage boosting ratio Rbst.

Figure 11:
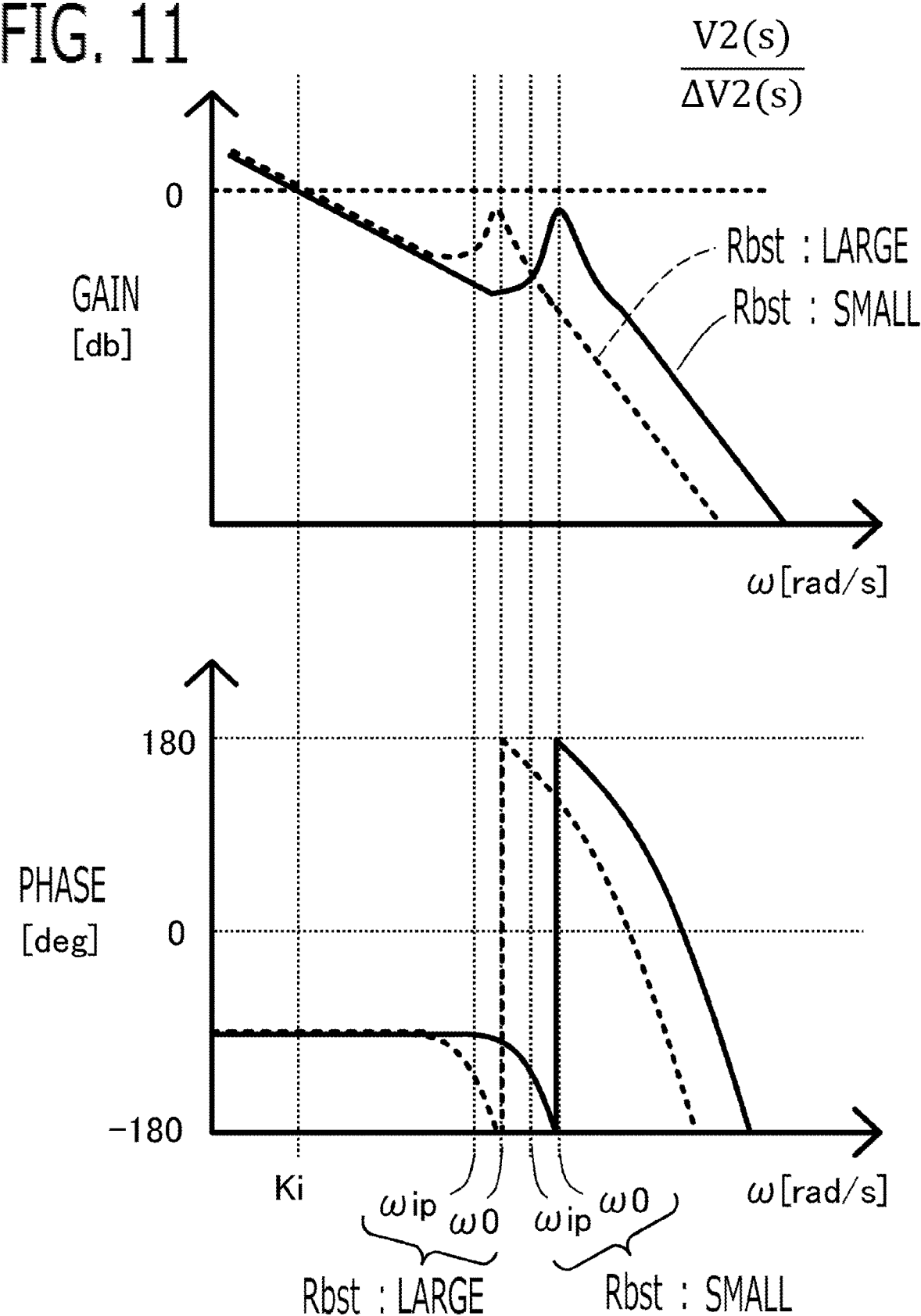
FIG. 11 is a Bode diagram of the open loop transfer function of the second voltage with respect to the voltage deviation at two different voltage boosting ratios according to Embodiment 1.

As shown in FIG. 9, FIG. 11, and the next equation, if the integral gain Ki is made smaller than the break point angular frequency ωip (=Ki/Kp), an angular frequency (a gain cross angular frequency) at which the gain of the transfer function of PI controller crosses 0 can be set to the integral gain Ki, the gain of angular frequencies higher than the gain cross angular frequency becomes less than 0, and the break point angular frequency ωip and the resonance angular frequency ω0 is arranged higher than the gain cross angular frequency. Accordingly, the gain of the transfer function of the second voltage V2 at the resonance angular frequency ω0 can be attenuated, and the stability can be secured. For this purpose, the proportional gain Kp is made smaller than 1.

$$K_i < \omega_{ip} = \frac{K_i}{K_p} \rightarrow K_p < 1 \quad (13)$$

FIG. 11 shows Bode diagram of an open loop transfer function from the deviation ΔV2 to the detection value of second voltage V2sen at the two different voltage boosting ratios Rbst when the control gains are set as shown in FIG. 10. The break point angular frequency ωip of PI controller is lowered appropriately in accordance with the resonance angular frequency ω0 which is lowered according to the increase of the voltage boosting ratio Rbst, and the gain of the open loop transfer function at the resonance angular frequency ω0 can be lowered than 0 appropriately. And, the phase delay can be suppressed.

The gain of the transfer function of the second voltage V2 with respect to the control value X at an angular frequency less than the resonance angular frequency ω0 becomes 0 by the correction of the control value correction unit 35 (refer to FIG. 8), and the integral gain Ki is not changed. Accordingly, as shown in FIG. 11, the characteristics of the open loop transfer function at angular frequencies less than the break point angular frequency ωip including the gain cross angular frequency (=Ki) can be maintained constant, and the response of the closed loop can be maintained constant. Accordingly, the equivalent stability and the equivalent response of the closed loop can be secured regardless of the change of the voltage boosting ratio Rbst and the resonance angular frequency ω0.

In FIG. 10, over the whole voltage boosting ratio Rbst, the proportional gain Kp is increased according to the increase of the voltage boosting ratio Rbst. However, in a partial section of the voltage boosting ratio Rbst, the proportional gain Kp may not be changed regardless of the increase of the voltage boosting ratio Rbst, but it may be a constant value.

If the response of the closed loop is desired to be changed according to the voltage boosting ratio Rbst, the control gain setting unit 34 may change the integral gain Ki according to the voltage boosting ratio Rbst. For example, the control gain setting unit 34 may increase the proportional gain Kp and increase the integral gain Ki as the voltage boosting ratio Rbst increases. By increasing the integral gain Ki, the gain of the open loop transfer function in the low frequency region can be increased as the voltage boosting ratio Rbst increases, and the response of the closed loop can be improved as the voltage boosting ratio Rbst increases. At this time, the proportional gain Kp and the integral gain Ki may be set based on the voltage boosting ratio Rbst, so that the break point angular frequency ωip of PI controller obtained by dividing the integral gain Ki by the proportional gain Kp becomes smaller than the resonance angular frequency ω0. Also in this case, in a partial section of the voltage boosting ratio Rbst, one or both of the proportional gain Kp and the integral gain Ki may not be changed regardless of the increase of the voltage boosting ratio Rbst, but it may be a constant value. The section of the voltage boosting ratio Rbst where the constant value is set may be different between the proportional gain Kp and the integral gain Ki.

If the necessary stability and the necessary response of the closed loop can be secured, the proportional gain Kp may be a constant value regardless of the change of the voltage boosting ratio Rbst. In addition to the proportional control and the integral control, other controls, such as a differential control, may be performed, or the proportional control may not be performed but only the integral control may be performed.

<Calculation of Voltage Boosting Ratio>

As shown in the next equation, the control gain setting unit calculates the voltage boosting ratio Rbst by dividing the detection value of second voltage V2sen or the target value of second voltage V2ref by the detection value of first voltage V1sen. As the detection value of second voltage V2sen and the detection value of first voltage V1sen, the detection values detected at the last time calculation period, or smoothing processing values, such as low pass filter processing values or moving average processing values of the detection values, may be used.

$$R_{bst} = \frac{V2_{sen}}{V1_{sen}} \text{ or } \frac{V2_{ref}}{V1_{sen}} \quad (14)$$

<Update Period of Control Gain>

The control gain setting unit 34 updates the control gain synchronizing with the on/off control period, at n/2 times of the on/off control period (PWM control period) (n is an integer greater than or equal to 1). As n becomes small, it is possible to perform the control with high response according to the voltage boosting ratio Rbst. As n becomes large, it is possible to secure robustness that hardly be affected by oscillation, disturbance, and the like.

2. Embodiment 2

Next, the power conversion circuit 10 and the controller 30 according to Embodiment 2 will be explained with reference to drawings. The explanation for constituent parts the same as those in Embodiment 1 will be omitted. The basic configuration and processing of the power conversion circuit 10 and the controller 30 according to the present embodiment is the same as that of Embodiment 1.

<Dumping Control>

Figure 12:
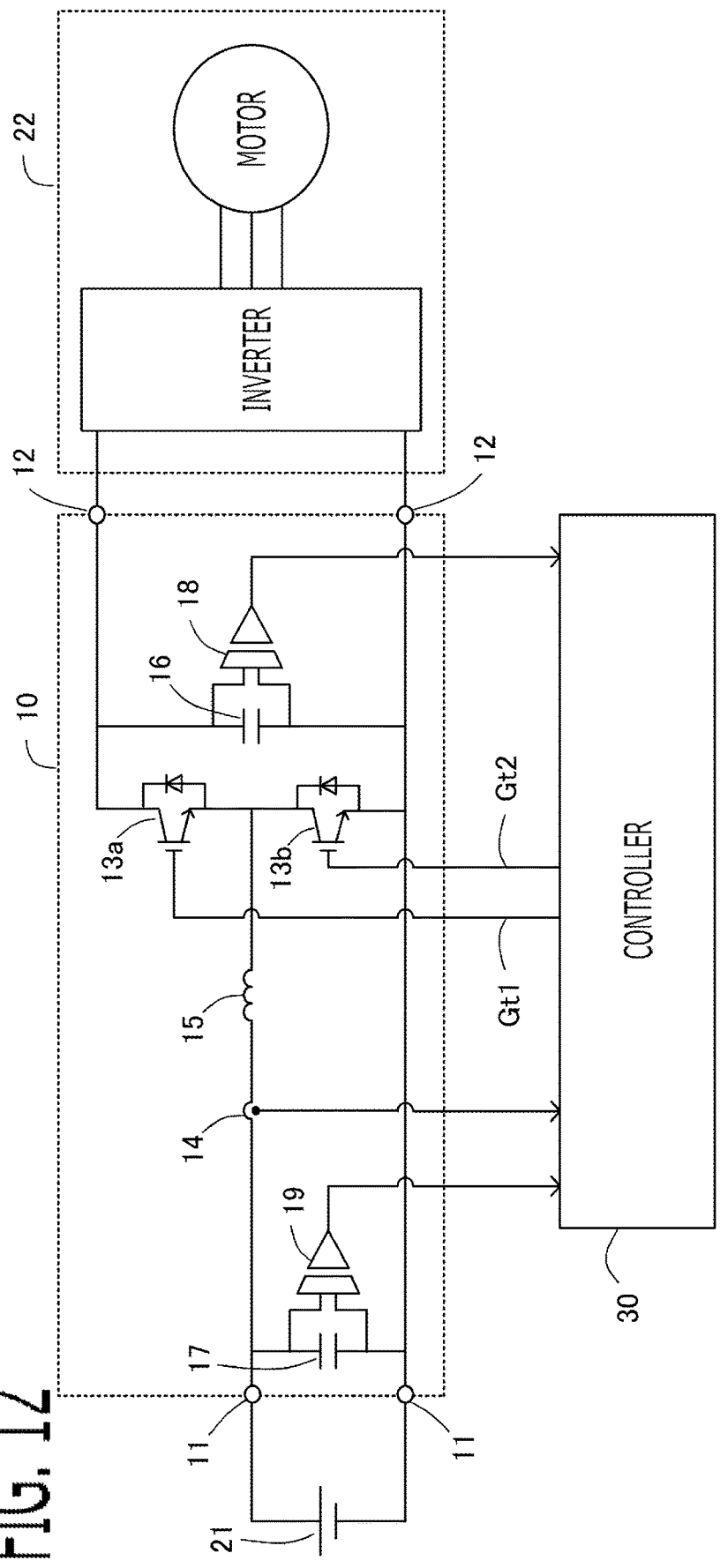
FIG. 12 is a schematic configuration diagram of the power conversion circuit and the controller according to Embodiment 2.
Figure 13:
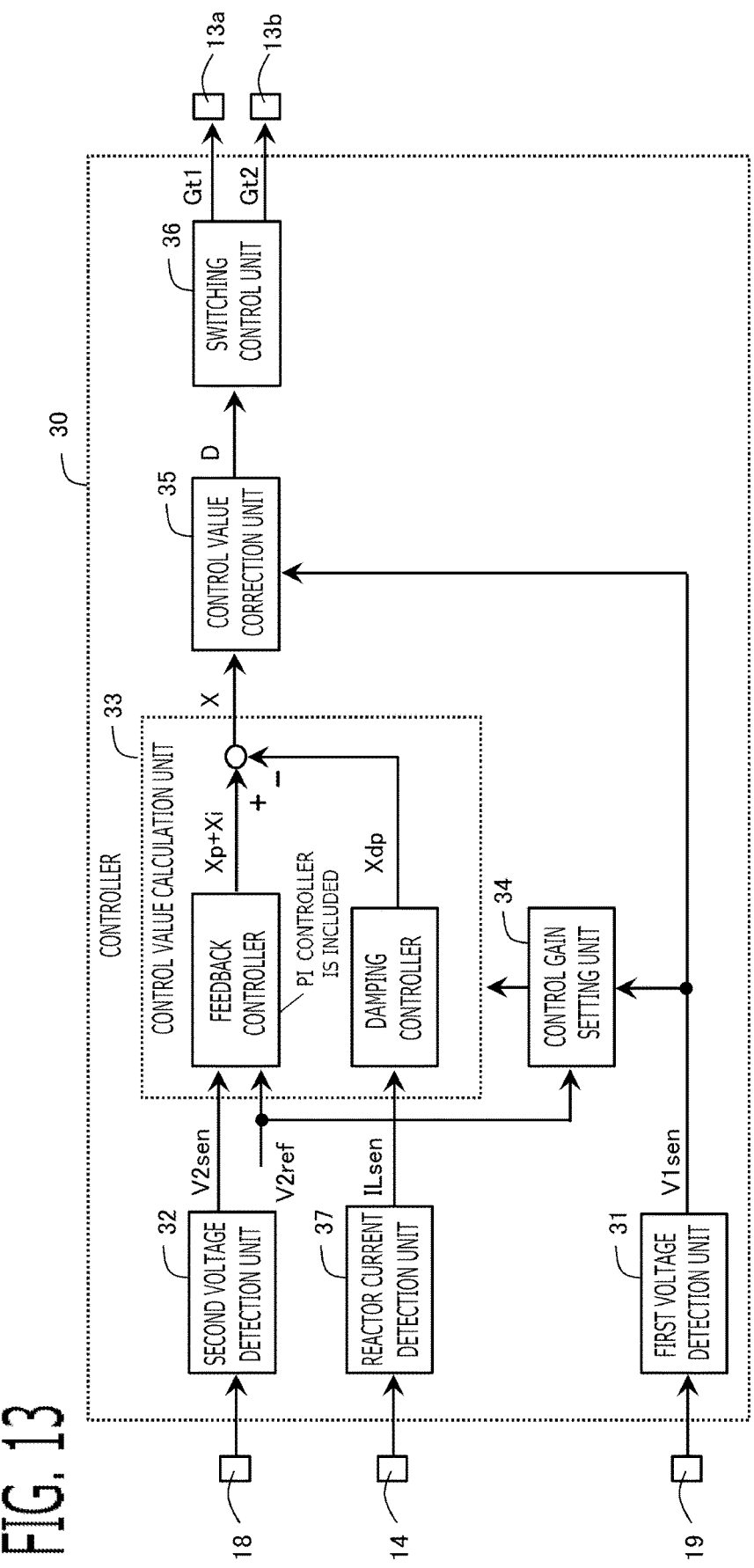
FIG. 13 is a block diagram of the controller according to Embodiment 2.

FIG. 12 is a schematic configuration diagram of the power conversion circuit 10 and the controller 30 according to the present embodiment. FIG. 13 is a block diagram of the controller 30 according to the present embodiment. In the present embodiment, the power conversion circuit 10 is provided with a reactor current sensor 14 which detects a reactor current IL flowing through the reactor 15. The reactor current sensor 14 is provided on the wire which connects the high potential side of the first terminal 11 and the reactor 15. The reactor current sensor 14 is a Hall element, a shunt resistance, or the like. The output signal of the reactor current sensor 14 is inputted into the controller 30.

The controller 30 is provided with a reactor current detection unit 37 that detects the reactor current IL flowing through the reactor 15. The reactor current detection unit 37 detects the reactor current IL based on the output signal of the reactor current sensor 14.

In the present embodiment, in addition to the proportional control and the integral control, the control value calculation unit 33 performs a dumping control. As shown in the first equation to the third equation of the equation (1), the control value calculation unit 33 calculates the deviation ΔV2 by subtracting the detection value of second voltage V2sen from the target value of second voltage V2ref; calculates the proportional control value Xp by multiplying the proportional gain Kp to the deviation ΔV2; and calculates the integral control value Xi by integrating a value obtained by multiplying the integral gain Ki to the deviation ΔV2.

The control value calculation unit 33 calculates an attenuation control value Xdp by multiplying an attenuation gain Kdp to the detection value of reactor current ILsen, as shown in the next equation. Then, the control value calculation unit 33 calculates the control value X by adding the proportional control value Xp and the integral control value Xi, and subtracting the attenuation control value Xdp.

$$X_{dp} = K_{dp} \times IL_{sen}$$

$$X = X_p + X_i - X_{dp} \quad (15)$$

As the detection value of reactor current ILsen used for the dumping control, the detection value of reactor current ILsen detected at the last time calculation period, or a smoothing processing value, such as a low pass filter processing value or a moving average processing value of the detection value of reactor current ILsen, may be used.

<Setting of Control Gain>

Figure 14:
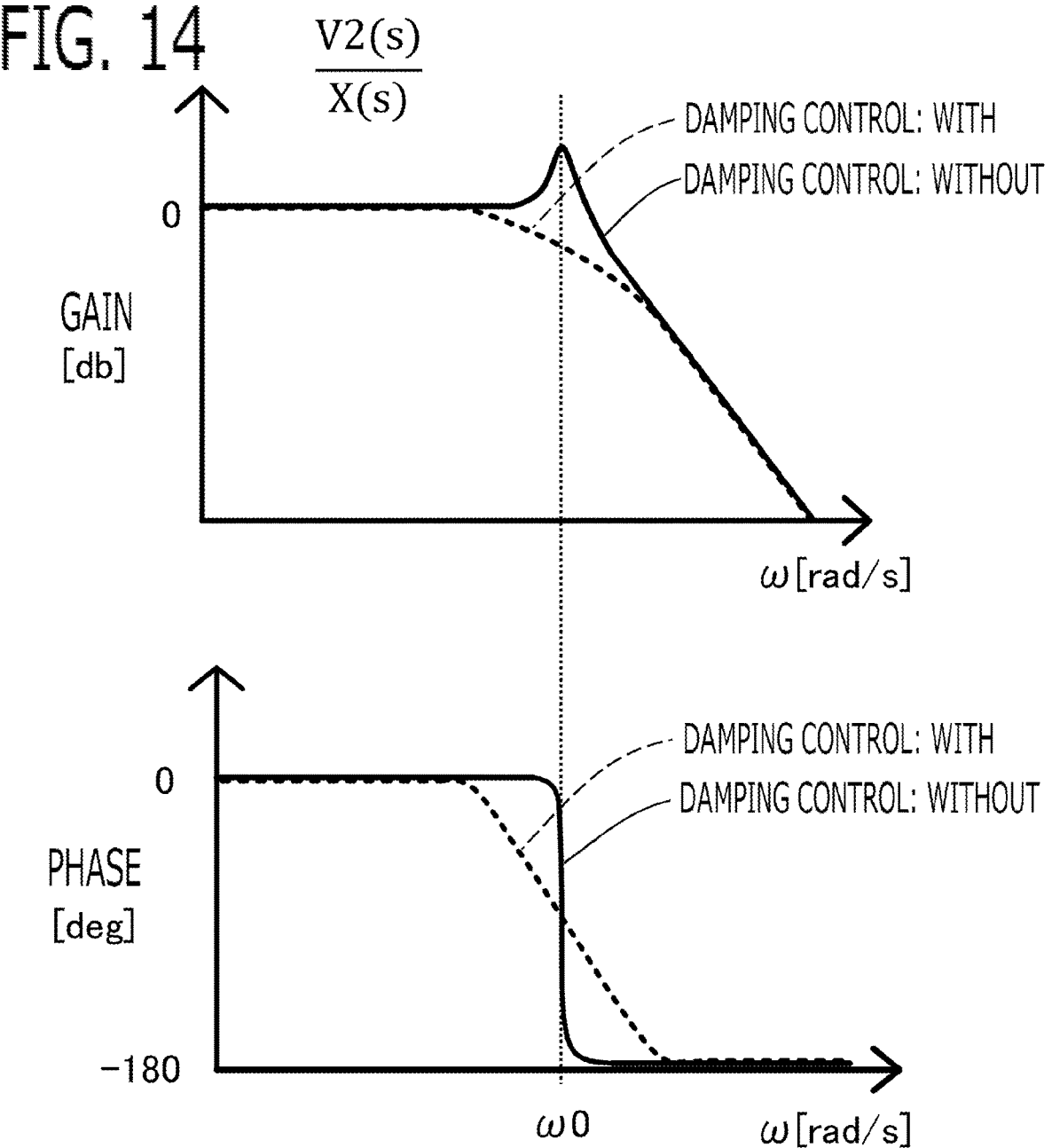
FIG. 14 is a Bode diagram of the transfer function of the second voltage with respect to the control value with and without the dumping control according to Embodiment 2.

FIG. 14 shows Bode diagram of a transfer function of the second voltage V2 with respect to the control value X in case of the present embodiment in which the dumping control is performed. For comparison, FIG. 14 also shows Bode diagram of a transfer function in case of Embodiment 1 in which the dumping control is not performed is also shown.

In the transfer function with the dumping control, compared with the transfer function without the dumping control, the peak value of gain at the resonance angular frequency ω0 becomes lower, and the delay of phase at the resonance angular frequency ω0 becomes gentler. That is to say, resonance can be attenuated by the dumping control.

Figure 15:
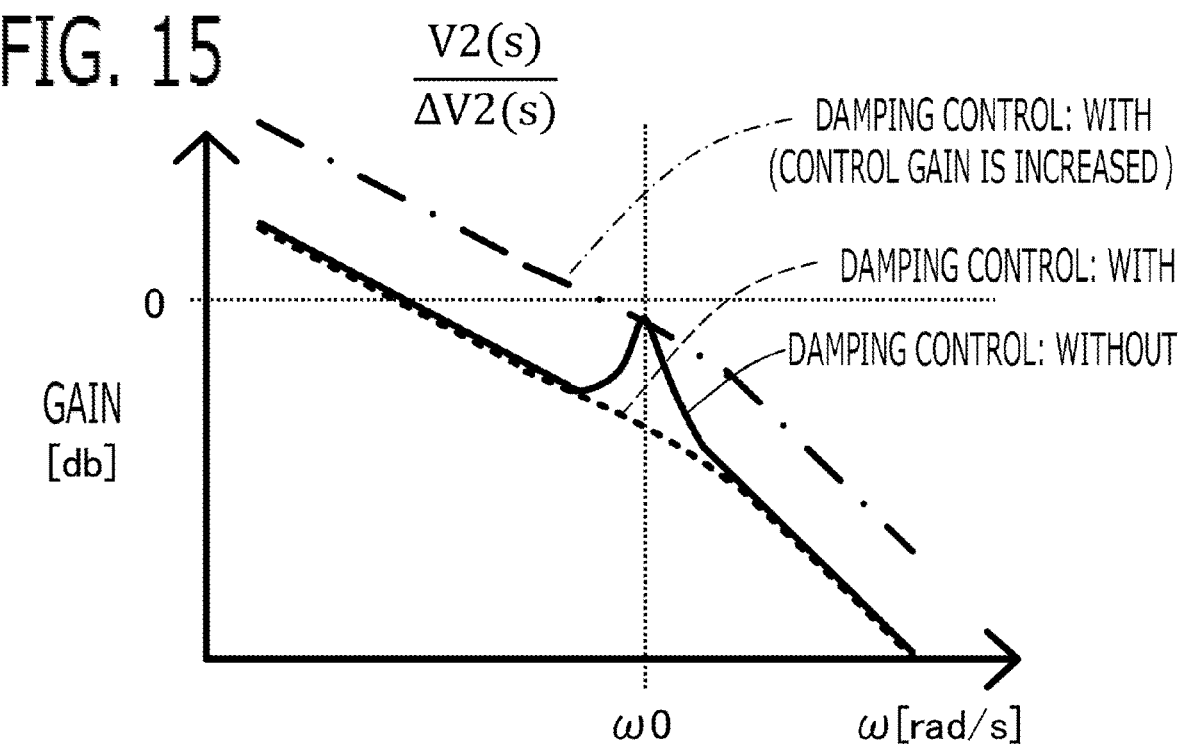
FIG. 15 is a Bode diagram of the open loop transfer function of the second voltage with respect to the voltage deviation according to Embodiment 2.

FIG. 15 shows Bode diagram of an open loop transfer function from the deviation ΔV2 to the detection value of second voltage V2sen when performing PI control of the same control gain with and without the dumping control. And, FIG. 15 shows Bode diagram of an open loop transfer function when increasing the control gain with the dumping control.

Since the peak value of gain at the resonance angular frequency ω0 when the dumping control is performed is lower than that when the dumping control is not performed, while maintaining the gain at the resonance angular frequency ω0 smaller than 0 [db], and maintaining the stability of the closed loop, the control gain can be increased. If the peak value of gain at the resonance angular frequency ω0 is sufficient low by the dumping control, unlike Embodiment 1, the proportional gain Kp and the integral gain Ki may not be set based on the voltage boosting ratio Rbst so that the break point angular frequency ωip (=Ki/Kp) becomes smaller than the resonance angular frequency ω0 which changes according to the voltage boosting ratio Rbst, or it may be set.

Figure 16:
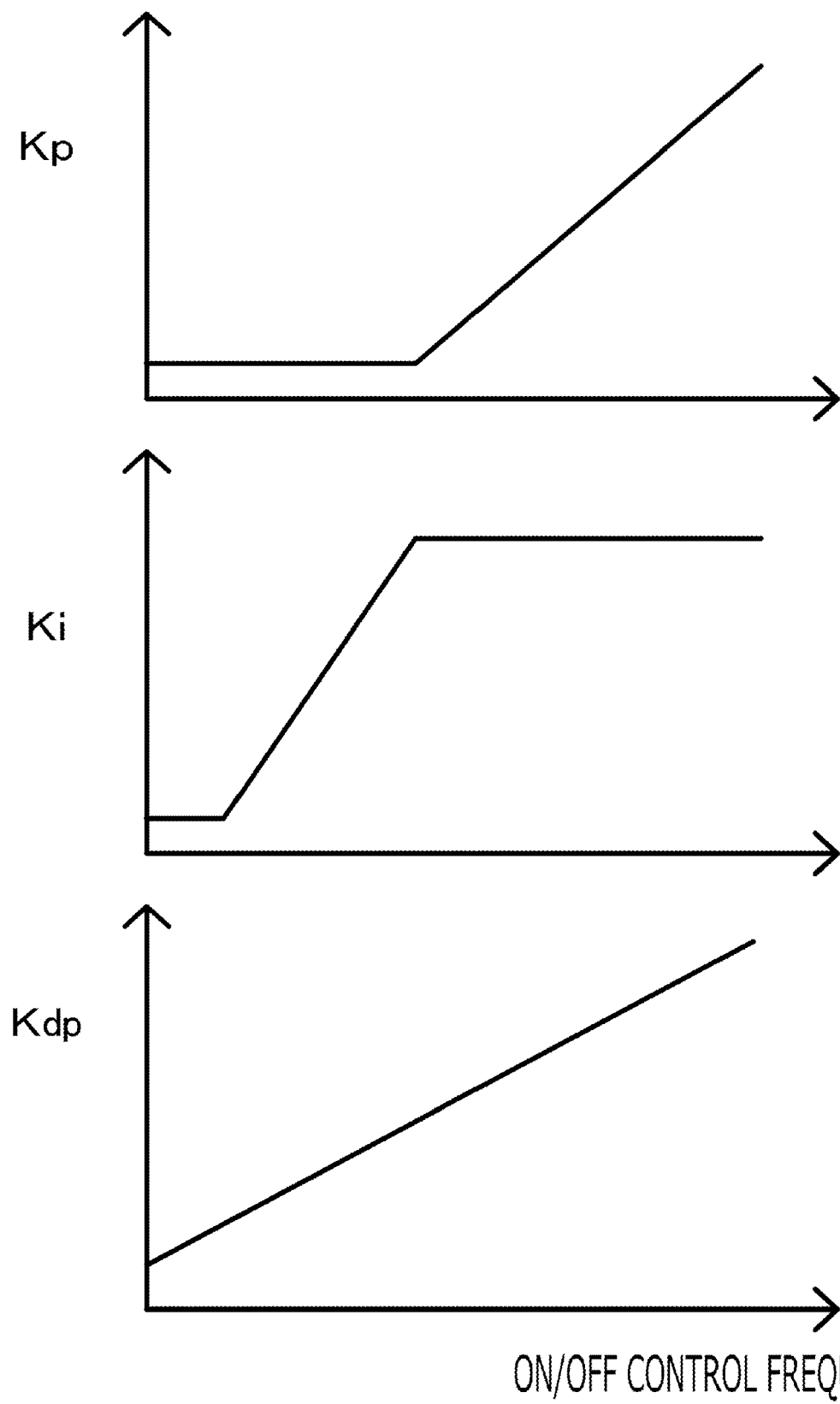
FIG. 16 is a figure for explaining the setting of the proportional gain, the integral gain, and the attenuation gain according to the on/off control frequency according to Embodiment 2.

In the present embodiment, the control gain setting unit 34 sets the proportional gain Kp, the integral gain Ki, and the attenuation gain Kdp. As shown in FIG. 16, as the on/off control frequency (PWM control frequency) of the switching device increases, the control gain setting unit 34 increases the proportional gain Kp, increases the integral gain Ki, and increases the attenuation gain Kdp. As the on/off control frequency becomes high, the phase delay due to the control delay becomes the high frequency side. According to the above configuration, even in the case where the phase delay due to the control delay changes when the on/off control frequency is changed, since each control gain is changed and the break point angular frequency ωip of PI controller can be set, the control response can be improved. In a partial section of the on/off control frequency, one or more of the proportional gain Kp, the integral gain Ki, and the attenuation gains Kdp may not be changed regardless of the increase of the on/off control frequency, and may be a constant value. The sections of the on/off control frequency where the constant value is set may be different among the proportional gain Kp, the integral gain Ki, and the attenuation gain Kdp.

As the on/off control frequency (PWM control frequency) increases, the control gain setting unit 34 may increase one or more of the proportional gain Kp, the integral gain Ki, and the attenuation gains Kdp. In this case, the proportional gain Kp, the integral gain Ki, or the attenuation gain Kdp which is not increased is not increased regardless of the increase of the on/off control frequency, and is set to a constant value.

As the control for reducing the peak value of gain at the resonance angular frequency ω0, various control, such as a current control, may be performed instead of the dumping control.

Other Embodiments (1) In each of the above-mentioned Embodiments, there was explained the case where the first voltage detection unit 31 detects the first voltage V1 based on the output signal of the first voltage detection circuit 19. However, the first voltage detection unit 31 may calculate the detection value of first voltage V1sen, based on the detection value of second voltage V2sen and the past control value for control Dold. For example, the next equation is used. As the past control value for control Dold, the control value for control D calculated in the last time calculation period, or a smoothing processing value of the control value for control D, such as a low pass filter processing value or a moving average processing value, is used.

$$V1_{sns} = V2_{sns} \times (1 - D_{old}) \qquad (16)$$

(2) In each of the above-mentioned Embodiments, there was explained the case where the power conversion circuit 10 is the step-up chopper circuit which steps up DC voltage from the first terminal 11 to the second terminal 12. However, embodiments of the present disclosure are not limited to the foregoing case. That is to say, as long as the power conversion circuit 10 is provided with the switching devices, and is a circuit which performs power conversion between the first terminal 11 and the second terminal 12, various kinds of power conversion circuits may be used. For example, the power conversion circuit 10 may be a bidirectional chopper circuit which combined a step-up chopper circuit stepping up DC voltage from the first terminal 11 to the second terminal 12, and a step-down chopper circuit stepping down DC voltage from the second terminal 12 to the first terminal 11.

(3) In each of the above-mentioned Embodiments, there was explained the case where the DC power source 21 is connected to the first terminal 11, and the load 22 of the inverter and the motor is connected to the second terminal 12. However, a power source or a load may be connected to the first terminal 11, and a power source or a load may be connected to the second terminal 12. And, various kinds of power sources and loads may be used for the power source and the load.

(4) In each of the above-mentioned Embodiments, there was explained the case where the control value calculation unit 33 uses PI control as the feedback control. However, the control value calculation unit 33 may use various kinds of controls other than PI control as the feedback control, and may calculate the control value X. In this case, the control gain setting unit 34 may change a control gain based on the voltage boosting ratio Rbst so as to maintain the stability and the response of closed loop against the change of the voltage boosting ratio Rbst.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A power conversion circuit controller with feedforward correction that controls a power conversion circuit which is provided with a high potential side switching device or diode, and a low potential side switching device which are connected between a second high potential side terminal and a second low potential side terminal in series, and a reactor whose one end is connected to a first high potential side terminal and whose other end is connected to a connection node between the high potential side switching device or diode, and the low potential side switching device, wherein the second low potential side terminal and the first low potential side terminal are connected, and performs power conversion between the first high potential side terminal and the first low potential side terminal, and the second high potential side terminal and the second low potential side terminal, the power conversion circuit controller with feedforward correction comprising at least one processor configured to implement:

a second voltage detector that detects a second voltage which is a voltage of the second high potential side terminal with respect to the second low potential side terminal;

a first voltage detector that detects a first voltage which is a voltage of the first high potential side terminal with respect to the first low potential side terminal;

a control value calculator that changes a control value by a feedback control so that a detection value of the second voltage approaches a target value of the second voltage;

a control value corrector that calculates a control value for control, by correcting the control value based on a detection value of the first voltage so as to correct, in a feedforward manner, a change of the control value due to a change of the first voltage; and a switching controller that controls on/off of the high potential side switching device and the low potential side switching device, or the high potential side switching device based on the control value for control, further including a control gain setter that sets a proportional gain and an integral gain, wherein the control value calculator calculates a proportional control value by multiplying the proportional gain by a deviation between the detection value of the second voltage and the target value of the second voltage.

2. The power conversion circuit controller with feedforward correction according to claim 1, wherein a DC power source whose output voltage is varied according to an internal state is connected to the first high potential side terminal and the first low potential side terminal.

3. The power conversion circuit controller with feedforward correction of claim 1, wherein the control value is set to X, wherein the control value calculator is configured to formulate the control value X, using a first calculation equation "X=Xp+Xi," Xp is a value proportional to a difference value calculated as "V2ref−V2sen," and wherein Xi is a value proportional to an integrated value of the difference value, V2sen is the detection value of the second voltage, and V2ref is a constant target voltage.

4. The power conversion circuit controller with feedforward correction of claim 1, wherein by setting the control value to X, setting the detection value of first voltage to V1sen, and setting the control value for control to D, the control value corrector calculates the control value for control D, using a calculation equation of "D=(X−V1sen)/X", based on the control value X calculated by the feedback control and the detection value of first voltage V1sen.

5. The power conversion circuit controller with feedforward correction according to claim 1, wherein the first voltage detector calculates, instead of the detection value of first voltage, an estimation value of first voltage, based on the detection value of second voltage, and the past control value for control.

6. A power conversion circuit controller with feedforward correction that controls a power conversion circuit which is provided with a high potential side switching device or diode, and a low potential side switching device which are connected between a second high potential side terminal and a second low potential side terminal in series, and a reactor whose one end is connected to a first high potential side terminal and whose other end is connected to a connection node between the high potential side switching device or diode, and the low potential side switching device, wherein the second low potential side terminal and the first low potential side terminalare connected, and performs power conversion between the first high potential side terminal and the first low potential side terminal, and the second high potential side terminal and the second low potential side terminal, the power conversion circuit controller with feedforward correction comprising at least one processor configured to implement:

a second voltage detector that detects a second voltage which is a voltage of the second high potential side terminal with respect to the second low potential side terminal;

a first voltage detector that detects a first voltage which is a voltage of the first high potential side terminal with respect to the first low potential side terminal;

a control value calculator that change a control value by a feedback control so that a detection value of the second voltage approaches a target value of the second voltage;

a control value corrector that calculates a control value for control, by correcting the control value based on a detection value of the first voltage so as to correct, in a feedforward manner, a change of the control value due to a change of the first voltage;

a switching controller that controls on/off of the high potential side switching device and the low potential side switching device, or the high potential side switching device based on the control value for control; and a control gain setter that sets a proportional gain and an integralgain, wherein the control value calculator calculates a proportional control value by multiplying the proportional gain to a deviation between the detection value of second voltage and the target value of second voltage; calculates an integral control value by integrating a value obtained by multiplying the integral gain to the deviation; and calculates the control value at least by adding the proportional control value and the integral control value, and wherein the control gain setter makes one or both of the proportional gain and the integralgain increase, as a voltage boosting ratio which is a ratio of the second voltage with respect to the first voltage increases.

7. A power conversion circuit controller with feedforward correction that controls a power conversion circuit which is provided with a high potential side switching device or diode, and a low potential side switching device which are connected between a second high potential side terminal and a second low potential side terminal in series, and a reactor whose one end is connected to a first high potential side terminal and whose other end is connected to a connection node between the high potential side switching device or diode, and the low potential side switching device, wherein the second low potential side terminal and the first low potential side terminal are connected, and performs power conversion between the first high potential side terminal and the first low potential side terminal, and the second high potential side terminal and the second low potential side terminal, the power conversion circuit controller with feedforward correction comprising at least one processor configured to implement:

a second voltage detector that detects a second voltage which is a voltage of the second high potential side terminal with respect to the second low potential side terminal;

a first voltage detector that detects a first voltage which is a voltage of the first high potential side terminal with respect to the first low potential side terminal;

a control value calculator that change a control value by a feedback control so that a detection value of the second voltage approaches a target value of the second voltage;

a control value corrector that calculates a control value for control, by correcting the control value based on a detection value of the first voltage so as to correct, in a feedforward manner, a change of the control value due to a change of the first voltage;

a switching controller that controls on/off of the high potential side switching device and the low potential side switching device, or the high potential side switching device based on the control value for control; and a control gain setter that sets a proportional gain and an integralgain, wherein the control value calculator calculates a proportional control value by multiplying the proportional gain to a deviation between the detection value of second voltage and the target value of second voltage; calculates an integral control value by integrating a value obtained by multiplying the integral gain to the deviation; and calculates the control value at least by adding the proportional control value and the integral control value, and wherein a resonance angular frequency [rad/s] of a transfer function of the second voltage with respect to the control value for control changes in inverse proportion to a voltage boosting ratio which is a ratio of the second voltage with respect to the first voltage, and wherein the control gain setter sets the proportional gain and the integral gain based on the voltage boosting ratio so that a value obtained by dividing the integral gain by the proportional gain becomes smaller than the resonance angular frequency [rad/s].

8. A power conversion circuit controller with feedforward correction that controls a power conversion circuit which is provided with a high potential side switching device or diode, and a low potential side switching device which are connected between a second high potential side terminal and a second low potential side terminal in series, and a reactor whose one end is connected to a first high potential side terminal and whose other end is connected to a connection node between the high potential side switching device or diode, and the low potential side switching device, wherein the second low potential side terminal and the first low potential side terminal are connected, and performs power conversion between the first high potential side terminal and the first low potential side terminal, and the second high potential side terminal and the second low potential side terminal, the power conversion circuit controller with feedforward correction comprising at least one processor configured to implement:

a second voltage detector that detects a second voltage which is a voltage of the second high potential side terminal with respect to the second low potential side terminal;

a first voltage detector that detects a first voltage which is a voltage of the first high potential side terminal with respect to the first low potential side terminal;

a control value calculator that change a control value by a feedback control so that a detection value of the second voltage approaches a target value of the second voltage;

a control value corrector that calculates a control value for control, by correcting the control value based on a detection value of the first voltage so as to correct, in a feedforward manner, a change of the control value due to a change of the first voltage;

a switching controller that controls on/off of the high potential side switching device and the low potential side switching device, or the high potential side switching device based on the control value for control;

a reactor current detector that detects a reactor current which flows through the reactor; and a control gain setter that sets a proportional gain, an integral gain, and an attenuation gain, wherein the control value calculator calculates a proportional control value by multiplying the proportional gain to a deviation between the detection value of second voltage and the target value of second voltage; calculates an integral control value by integrating a value obtained by multiplying the integral gain to the deviation; calculates an attenuation control value by multiplying the attenuation gain to a detection value of the reactor current; and calculates the control value at least by adding the proportional control value and the integral control value, and subtracting the attenuation control value.

9. The power conversion circuit controller with feedforward correction according to claim 8, wherein the control gain setter makes one or more of the proportional gain, the integralgain, and the attenuation gain increase, as an on/off control frequency of the high potential side switching device and the low potential side switching device, or the high potential side switching device increases.

10. The power conversion circuit controller with feedforward correction according to claim 8, wherein the control gain setter that sets a control gain used in the control value calculator, and wherein the control gain setter updates the control gain synchronizing with an on/off control period, at n/2 times of the on/off control period (n is an integer greater than or equal to 1).

* * * * *